United States Patent
Phadnis et al.

(12)

(10) Patent No.: US 6,901,079 B1
(45) Date of Patent: May 31, 2005

(54) PROVIDING DIFFERENT QUALITY OF SERVICES (QOS) TO DIFFERENT POINT-TO-POINT SESSIONS

(75) Inventors: Amit Phadnis, Karnataka (IN); Pankaj Vyas, Karnataka (IN); Praneet Bachheti, San Jose, CA (US)

(73) Assignee: Cisco Technology, Inc, San Jose, CA (US)

( * ) Notice: Subject to any disclaimer, the term of this patent is extended or adjusted under 35 U.S.C. 154(b) by 958 days.

(21) Appl. No.: 09/837,457

(22) Filed: Apr. 19, 2001

(51) Int. Cl.[7] ................................................. H04J 3/16
(52) U.S. Cl. ...................... 370/466; 370/395.1; 370/401
(58) Field of Search ................................. 370/401, 400, 370/235.1, 235, 236, 352–356, 395.1, 338, 412, 466, 467, 229, 398; 713/160; 709/226, 238

(56) References Cited

U.S. PATENT DOCUMENTS

| | | | | |
|---|---|---|---|---|
| 6,118,785 | A | * | 9/2000 | Araujo et al. ............... 370/401 |
| 6,404,737 | B1 | * | 6/2002 | Novick et al. ............ 370/235.1 |
| 6,512,754 | B2 | * | 1/2003 | Feder et al. ................. 370/338 |
| 6,667,971 | B1 | * | 12/2003 | Modarressi et al. ......... 370/352 |
| 6,804,776 | B1 | * | 10/2004 | Lothberg et al. ............ 713/160 |

OTHER PUBLICATIONS

W. Simpson, Entitled, "Request for Comments: 1661–Point to Point Protocol", Available from www.ietf.org: Jul. 1994; 54 Pages.

Townsley et al.; Request for Comments: 2661–Layer Two Tunneling Protocol "L2TP"; Available from www.ietf.org; Aug. 1999; 80 Pages.

* cited by examiner

Primary Examiner—John Pezzlo
(74) Attorney, Agent, or Firm—Narendra R. Thappeta (57) ABSTRACT

An aggregation device providing different QOS to different point-to-point sessions. Multiple virtual circuits, each to provide different QOS, may be provisioned. The aggregation device may be configured to indicate the desired QOS for each point-to-point session and the data related to each point-to-point session may be assigned to a virtual circuit providing the closest matching QOS. Alternatively, a service provider may statically specify the specific virtual circuit on which the data related to a specific point-to-point session is to be transmitted. Each point-to-point session receives a QOS provided by the assigned virtual circuit. As the content of each datagram received on a point-to-point session may not need to be examined for the purpose of assignment to a virtual circuit, an aggregation device may forward datagrams quickly.

25 Claims, 4 Drawing Sheets

PROVIDING DIFFERENT QUALITY OF SERVICES (QOS) TO DIFFERENT POINT-TO-POINT SESSIONS

BACKGROUND OF THE INVENTION

1. Field of the Invention

The present invention relates to communication networks, and more specifically to a method and apparatus for providing different quality of services (QOS) to different point-to-point sessions.

2. Related Art

Point-to-point sessions are often set up between remote systems (e.g., personal computer systems at homes) and communication networks. A PPP session generally allows data transfer between a remote system and a termination device situated at the edge of a communication network. Point-to-point protocol (PPP) described in request for comment (RFC) 1661, available from www.ietf.org, is a common protocol using which point-to-point sessions are established.

The termination device usually provides additional communication to enable a remote system (at one end of a session) to communicate with a target host as is also well known in the relevant arts. The communication between a host and a remote system forms the basis for several user applications. As the host systems and remote systems are at either end of corresponding applications, the two systems are commonly referred to as end systems.

A prior communication network may be designed to provide the same quality of services (QOS) to several point-to-point sessions. While such a model is simple to implement and has the related advantages, it may not be suitable in some environments. For example, a point-to-point session used for real-time or interactive applications may need low latency and predictable high bandwidth, while a session used for batch applications may merely need bandwidth unused on a communication network.

In one embodiment, network devices located at the edge of a communication network may be designed to examine each datagram related to a point-to-point session and provide differentiated services to each packet. As used in the present application, a datagram refers to fixed (e.g., ATM cells) or variable length (e.g., Internet Protocol Packets) data units used for communication between remote systems and communication networks. However, the overhead resulting from the examination of each datagram may be unacceptable at least in some environments.

Accordingly what is needed is a method and apparatus which enables different QOS to be provided to different point-to-point sessions while minimizing the overhead on the network devices.

SUMMARY OF THE INVENTION

An aggregation device in accordance with the present invention enables a service provider to provide differentiated services to point-to-point sessions. Multiple virtual circuits providing different quality of services (QOS) may be provisioned on a communication network by appropriate configuration of the aggregation device. The data related to each point-to-point session may be sent on one of the virtual circuits depending on the QOS desired for the point-to-point session.

In one embodiment, a service provider specifies the desired QOS for each point-to-point session. The desired QOS is mapped to a virtual circuit providing the closest matching services, and the data related to the point-to-point session is sent on the mapped virtual circuit. Alternatively, a service provider may directly specify the virtual circuit for each point-to-point session, and the data for a point-to-point session may be transmitted on the specified virtual circuit.

The data for each point-to-point session may be received in the form of datagrams. The data in each data datagram may be assigned to one of the virtual circuits without potentially having to examine the contents of the datagram. As a result, an aggregation may process each datagram quickly, and the throughput performance of an aggregation device may not be affected by providing different QOS to different point-to-point sessions.

An embodiment of the aggregation device may be implemented to transfer the data in the datagrams on a tunnel (to a peer aggregation device) implemented on a virtual circuit (VC) bundle. The VC bundle may contain multiple virtual circuits implemented using asynchronous transfer mode (AIM) protocol. In such an environment, the aggregation device may first determine the tunnel to which the point-to-point session relates, and then the specific virtual circuit is determined based on a precedence value for the point-to-point session. The precedence value may be statically configured in a table by a service provider. The aggregation device may be implemented using a combination of one or more of hardware, firmware or software.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

A network device in accordance with the present invention provides potentially different quality of services (QOS) to different point-to-point sessions. In an embodiment, a network device located at the edge of a communication network is configured to transmit data related to different point-to-point sessions on different virtual circuits providing different QOS. Accordingly, the data related to each point-to-point session may be transmitted on a virtual circuit providing the desired (or close match thereto) QOS for the session.

The invention is described below with reference to an example environment for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention. Furthermore the invention can be implemented in several other environments.

2. Example Environment

Figure 1:
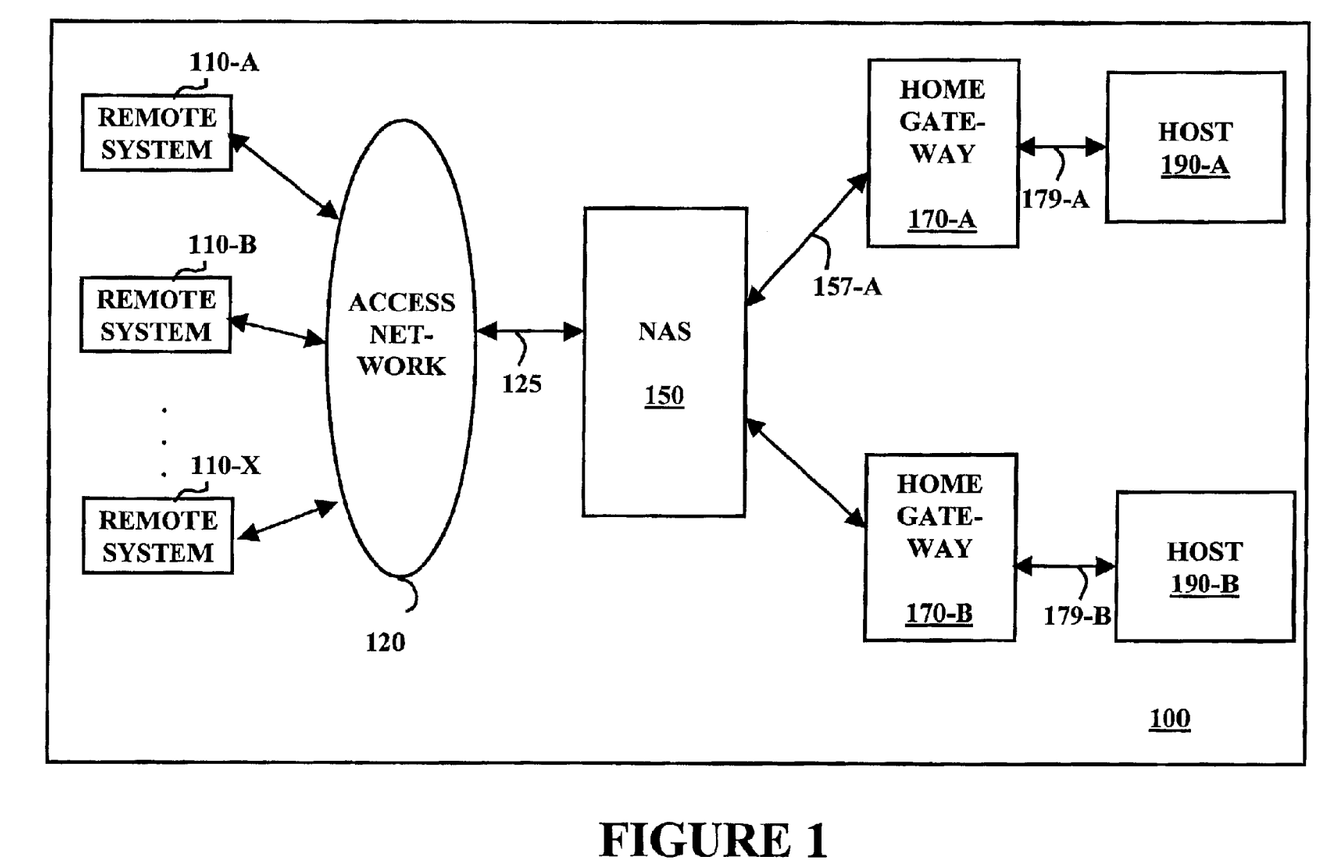
FIG. 1 is a block diagram illustrating an example communication environment in which the present invention can be implemented.

FIG. 1 is a block diagram illustrating an example communication environment 100 in which the present invention can be implemented. Communication environment 100 is shown containing remote systems 110-A through 110-X, access network 120, network access server (NAS) 150, home gateways 170-A and 170-B, and hosts 190-A and 190-B. Access network 120, NAS 150 and home gateways 170-A and 170-B may be together referred to as a communication network providing connectivity between remote systems and target hosts. Each component is described below in further detail.

Remote systems 110-A through 110-X are used by subscribers (or end users) to access hosts of interest. Devices commonly knows as customer premise equipment (CPE) and computer systems with modems are examples of remote systems 110-A through 110-X. Each remote system 110-A through 110-X may access a desired host 190-A or 190-B. Remote systems 110-A through 110-A send and receive datagrams according to pre-determined conventions (e.g., Internet Protocol). The data in the datagrams serves as a basis for supporting several user applications between hosts 190-A and 190-B, and remote systems 110-A through 110-X.

Access network 120 provides the electrical and physical interface consistent with the technology (e.g., remote access, Digital Subscriber Line) used by the corresponding remote system. Access network 120 may transport datagrams between remote systems and NAS 150. Backbone path 157-A may contain several intermediate network devices (not shown) and can be implemented in a known way.

Network access server (MAS) 150 and home gateways 170-A and 170-B (aggregation devices in general) may be configured to support lower level protocols on the side of path 157-A, and layer-3 protocols on the other side. In addition, virtual circuits may be provisioned on path 157-A by appropriate configuration of the aggregation devices and any intermediate network devices (e.g., ATM switches). The manner in which the aggregation devices may provide differentiated services to different point-to-point sessions is described below in further detail.

3. Method

Figure 2:
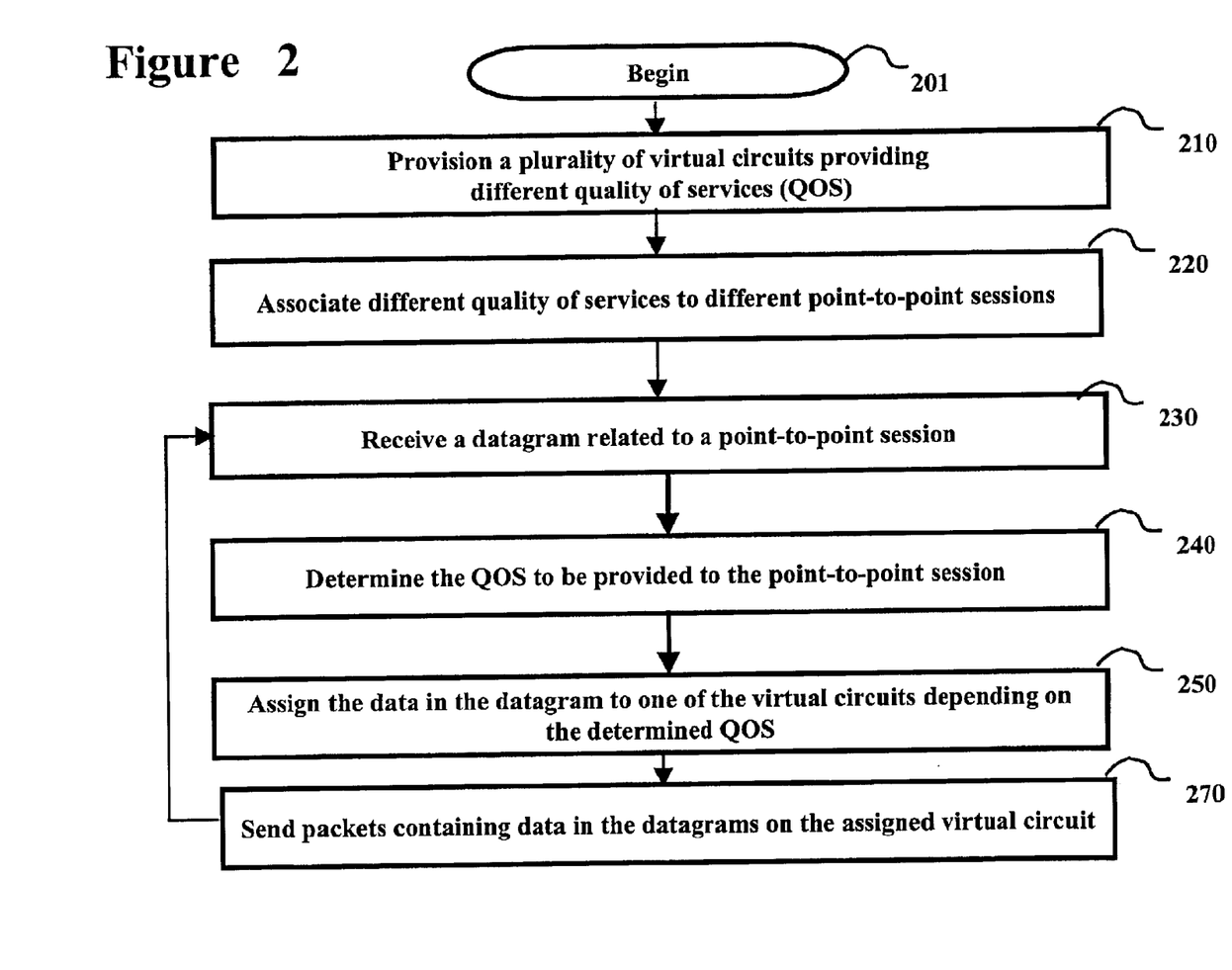
FIG. 2 is a flow chart illustrating a method in accordance with the present invention.

FIG. 2 is a flow chart depicting a method in accordance with the present invention. The method is described with reference to FIG. 1 for illustration. However, the method may be performed in other environments also. The method starts in step 201, in which control immediately passes to step 210.

In step 210, a plurality of virtual circuits with different quality of services (QOS) are provisioned on backbone path 157-A by appropriate configuration of NAS 150 and home gateway 170-A. The configuration may be performed either manually or automatically using a suitable signaling protocol.

In step 220, different QOS may be associated with different point-to-point sessions. In an embodiment, a service provider specifies the desired services for each user, and when the user establishes a point-to-point session, the specified services are associated with the point-to-point session established for the user. The desired services may be specified using several approaches. Some example approaches are described below.

In step 230, NAS 150 receives a datagram related to a point-to-point session. In step 240, NAS 150 determines the QOS to be provided to the point-to-point session to which the datagram relates to The determination may be made according to the specification of step 220.

In step 250, NAS 150 assigns the data in the datagram to one of the virtual circuits depending on the QOS to be provided. The virtual circuit provisioned with at least the closest virtual circuit may be selected.

In step 270, the data is transmitted on the assigned virtual circuit. The data is encapsulated consistent with the protocol supporting the virtual circuit on path backbone path 157-A.

As the data related to point-to-point sessions can be transmitted on virtual circuits providing different QOS, different QOS can be provided to different point-to-point sessions. Accordingly, a service provider may provide differentiated services to different sessions, and charge end users according to the provided services. The description is continued with an embodiment of NAS 150 in accordance with the present invention.

4. Network access server (NAS)

Figure 3:
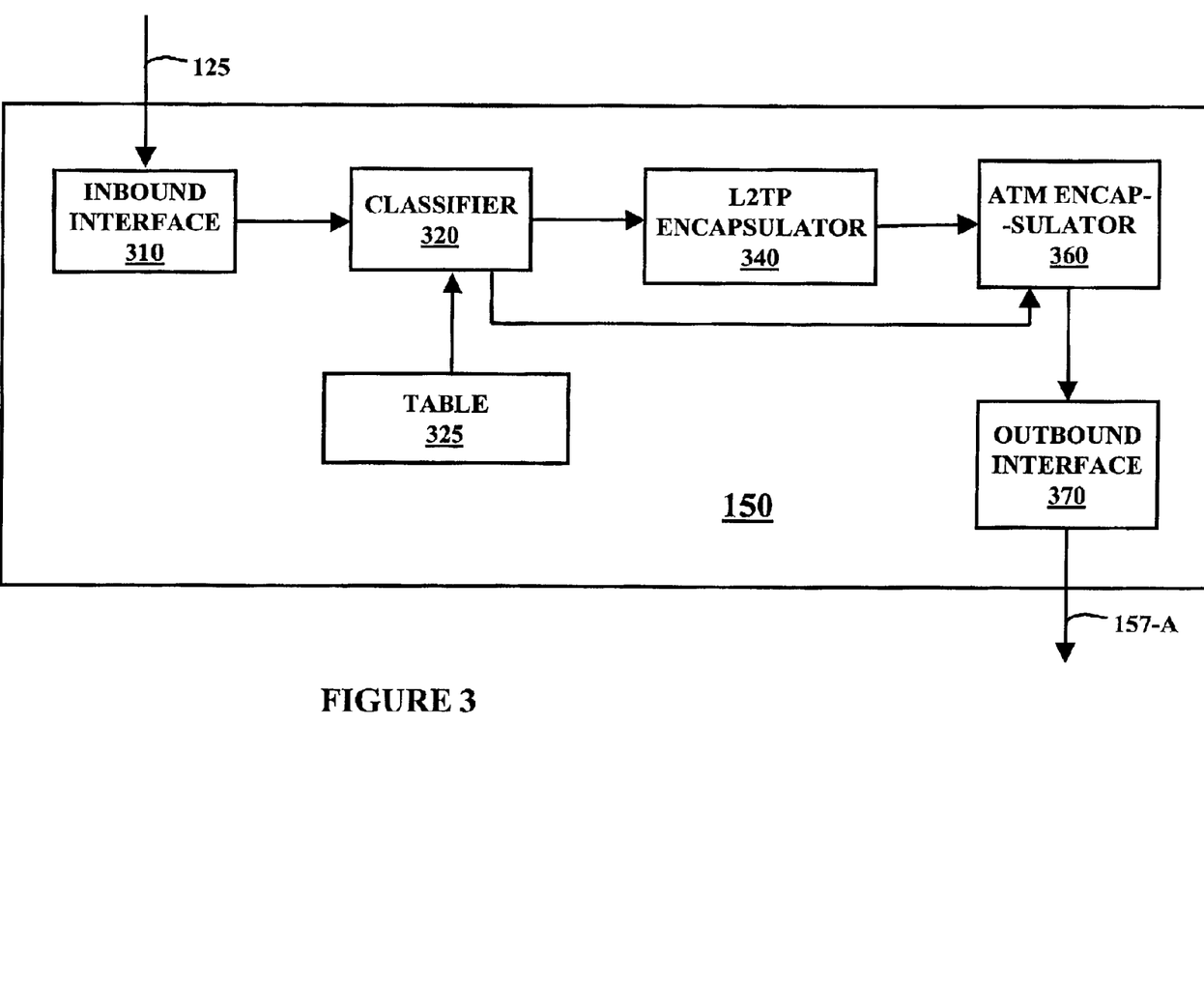
FIG. 3 is a block diagram illustrating the internals of a network access server (NAS) in an embodiment of the present invention.

FIG. 3 is a block diagram illustrating the internals of NAS 150 in an embodiment of the present invention. The embodiment is shown as providing different QOS to different PPP sessions implemented on a tunnel provided on an asynchronous transfer mode (ATM) backbone. However, the present invention may be implemented in other packet based communication networks also.

The tunnel in turn is described as being supported by a VC bundle. A VC bundle contains several virtual channels configured on backbone path 157-A, and a single routing (or forwarding) entry may be maintained for each VC bundle. As a result, the number of entries in the routing tables may be minimized and the implementation of the routing protocol may also be simplified. In an embodiment, each virtual channel of a VC bundle contains an ATM VC configured to provide a unique QOS.

In addition, multiple tunnels may be implemented between the same pair of aggregation devices (e.g., NAS 150 and home gateway 170-A). The tunnels can be used to further differentiate the QOS offered for different point-to-point sessions.

Only the details of the technologies as relevant to an understanding of various aspects of the present invention are described in the present application. The reader is referred to the following public documents for further details on the corresponding technology, and all the documents are incorporated in their entirety into the present application:

ATM: Book entitled, "ATM: Theory and Application", ISBN Number: 0-07-060362-6, by David E. McDysan and Darren L. Spohn;

Point-to-point session: RFC 1661, available from www.ietf.org;

Internet Protocol (IP): RFC 791, available from www.ietf.org; and

Tunnels: RFC 2661, available from www.ietf.org.

Continuing with reference to FIG. 3, NAS 150 is shown containing inbound interface 310, classifier 320, table 325, L2TP encapsulator 340, ATM encapsulator 360, and outbound interface 370. Each component of network aggregation server 150 is described below in further detail.

Each component of network aggregation server 150 may be implemented in a combination of one or more of hardware, software and firmware. In general, when throughput performance is of primary consideration, the implementation is performed more in hardware (e.g., in the form of an application specific integrated circuit). When cost is of primary consideration, the implementation is performed more in software (e.g., using a processor executing instructions provided in software/firmware). Cost and performance can be balanced by implementing network aggregation server 150 with a desired mix of hardware, software and/or firmware.

Inbound interface 310 receives datagrams at layer-3 level (e.g., according IP, IPX or AppleTalk protocol) on a point-to-point session ("PPP session") implemented on path 125 and forwards the datagram and port information to classifier 320. In general, inbound interface 310 provides the necessary electrical and other protocol interface to facilitate the reception of the datagrams. Inbound interface 310 may be implemented in a known way.

Table 325 may logically contain several tables. In an embodiment, a service provider may indicate (either within NAS 150 or outside) the services to be provided to each user. When a user establishes a point-to-point session (for example, by dialing in on a public switched telephone network), the services for the session may be determined based on the user's identity (determined, for example, using an authentication process). A session identifier assigned to the then established point-to-point session is used to indicate the services to be provided to the user in table 325. Table 325 may be implemented in a random access memory (an example of a memory) widely available in the market place.

In an embodiment, table 325 may store data to map the incoming PPP session to a L2TP tunnel and the VC bundle on which the L2TP tunnel is supported. Table 325 may further be configured with a precedence value for each point-to-point session. The precedence value may be used to determine a particular virtual circuit in the VC bundle. Alternatively, table 325 may merely associate each point-to-point session (session identifier) with a virtual circuit (within a group of virtual circuits), and data received on each point-to-point session may be send on the associated virtual circuit.

Classifier 320 determines a session identifier associated with each datagram received from inbound interface 310. Classifier 320 accesses table 325 using the session identifier to determine the manner in which the data in the datagram is transmitted. In an embodiment, the data retrieved includes a L2TP tunnel identifier, VC bundle identifier, session identifier (at the remote end), and a virtual circuit identifier. The tunnel may uniquely identify the bundle as each tunnel is typically implemented using a VC bundle. In an alternative embodiment, classifier 320 marks each datagram with a priority (services), and the specific virtual circuit may be determined later by ATM encapsulator 360.

L2TP encapsulator 340 receives the tunnel identifier and the precedence value of the datagram (or more specifically the point-to-point session) from classifier 320, and encapsulates the datagram according to the L2TP protocol. The precedence value is then used to determine the virtual circuit in the VC bundle. The encapsulated data is passed to ATM encapsulator 360 with the determined Virtual circuit identifier.

ATM encapsulator 360 receives each datagram marked with the corresponding priority (or desired QOS), and determines a specific virtual circuit based on the marked data. In an embodiment, each VC bundle may contain eight virtual circuits, each designed to provide a pre-specified QOS. ATM encapsulator 360 determines the specific virtual circuit based on the desired QOS. In general, the components of NAS 150 which together operate to select the specific virtual circuit are together referred to as a VC selection component.

Outbound interface 370 provides the necessary protocol and physical interface for transmitting the ATM packets on backbone path 157-A. Outbound interface 370 receives the encapsulated cells from ATM encapsulator 360, and sends the received cells to home gateway 170-A on path 157-A. It should be appreciated that the data related to each point-to-point session receives a different desired QOS as specified in table 325.

Home gateway 170-A receives the ATM cells on path 157-A, and associates the data to the corresponding point-to-point sessions. The data related to each point-to-point session may be received on a single virtual circuit of a VC bundle. The pay-load data in each cell may be associated with a corresponding point-to-point session in a known way. Home gateway 170-A may then interface with host 190-A to enable an application to be implemented between remote system 110-A and host 190A also in a known way.

Thus, a service provider may cause data related to different point-to-point sessions to be forwarded on different virtual circuits providing different QOS, and charge the end users according to the offered services. As noted above, NAS 150 may enable such differentiated services. An embodiment of NAS 150 implemented substantially in the form of software is described below in further detail.

However, several modifications can be made to the above-described approach without departing from the scope and spirit of the present invention as will be apparent to one skilled in the relevant arts by reading the disclosure herein. For example, a group of virtual circuits (each supporting a different QOS) may be implemented without supporting a tunnel, and the data related to different PPP sessions may be forwarded on different virtual circuits to provide different QOS. The description is continued with respect to a software implementation of NAS 150.

7. Software Implementation

Figure 4:
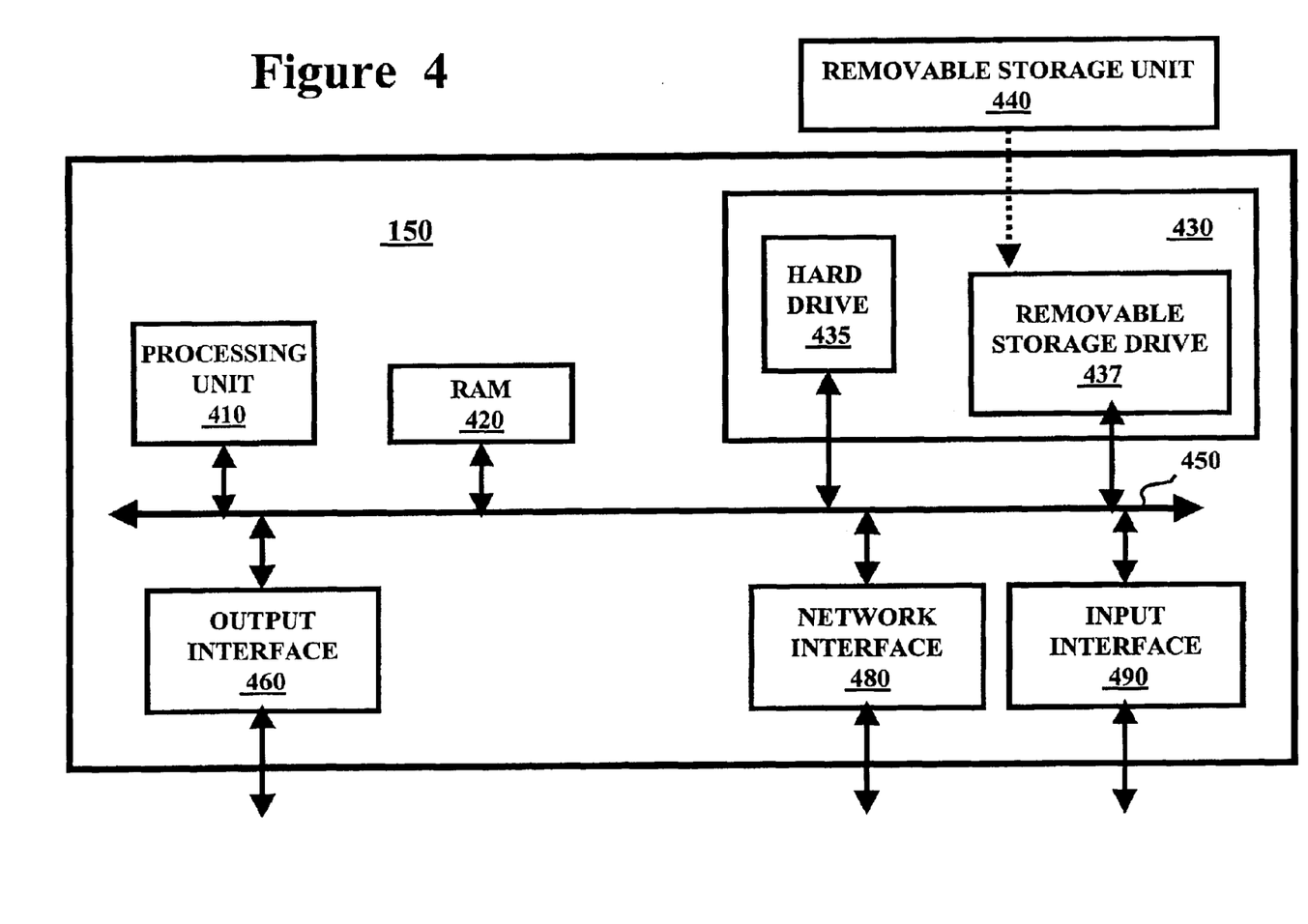
FIG. 4 is a block diagram illustrating the details of a NAS implemented substantially in software.

FIG. 4 is a block diagram illustrating the details of a network device (e.g., NAS 150) in one embodiment. NAS 150 is shown containing processing unit 410, random access memory (RAM) 420, storage 430, output interface 460, network interface 480 and input interface 490. Each component is described in further detail below.

Output interface 460 provides output signals (e.g., display signals to a display unit, not shown) which can form the basis for a suitable user interface for a user to interact with NAS 150. Input interface 490 (e.g., interface with a keyboard and/or mouse, not shown) enables a user to provide any necessary inputs to NAS 150. Output interface 460 and input interface 490 can be used, for example, to enable configuration of NAS 150 to provide various features of the present invention.

Network interface 480 enables NAS 150 to send and receive data on communication networks using protocols such as asynchronous transfer mode (ATM). Network interface 480 may correspond to inbound interface 310 and output interface 390 of FIG. 3. Network interface 480, output interface 460 and input interface 490 can be implemented in a known way.

RAM 430 and storage 430 may together be referred to as a memory. RAM 430 may receive instructions and data on path 450 from storage 430. Secondary memory 430 may contain units such as hard drive 435 and removable storage drive 437. Secondary storage 430 may store the software instructions and data, which enable NAS 450 to provide several features in accordance with the present invention.

Some or all of the data and instructions may be provided on removable storage unit 440, and the data and instructions may be read and provided by removable storage drive 437 to processing unit 410. Floppy drive, magnetic tape drive, CD-ROM drive, DVD Drive, Flash memory, removable memory chip (PCMCIA Card, EPROM) are examples of such removable storage drive 437.

Processing unit 410 may contain one or more processors. Some of the processors can be general purpose processors which execute instructions provided from RAM 420. Some can be special purpose processors adapted for specific tasks (e.g., for memory/queue management). The special purpose processors may also be provided instructions from RAM 420. In general processing unit 410 reads sequences of instructions from various types of memory medium (including RAM 420, storage 430 and removable storage unit 440), and executes the instructions to provide various features of the present invention.

Thus, embodiments according to FIG. 4 can be used to send data related to different point-to-point sessions in different virtual circuits providing different QOS as described above. Thus, the present invention enables differentiated services to be offered to end users, and a service provider may conveniently charge the end users consistent with the offered services.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of providing different quality of services (QOS) in a communication network to data related to different point-to-point sessions, said method comprising:

provisioning in a first aggregation device a plurality of virtual circuits, said plurality of virtual circuits being provisioned between said first aggregation device and a second aggregation device located in said communication network, each of said plurality of virtual circuits being provisioned to provide a different QOS;

receiving in said first aggregation device a plurality of datagrams, each of said plurality of datagrams being related to a corresponding one of a plurality of point-to-point sessions;

determining a point-to-point session to which each of said plurality of datagrams relates to;

assigning each of said plurality of datagrams to one of said plurality of virtual circuits depending on the QOS desired for the corresponding point-to-point session; and sending the data in each of said datagrams to said second aggregation device in the form of a packet on a corresponding assigned virtual circuit, whereby different point-to-point sessions receive different QOS.

2. The method of claim 1, wherein said packet comprises an asynchronous transfer mode (ATM) cell.

3. The method of claim 2, wherein said plurality of virtual circuits supports a tunnel between said first aggregation device and said second aggregation device.

4. The method of claim 3, wherein said plurality of virtual circuits are comprised in a virtual circuit (VC) bundle supporting said tunnel, said method further comprising mapping said point-to-point session to said tunnel by examining a table, wherein said table further specifies a precedence value associated with said point-to-point session, wherein said assigning comprises determining said one of said plurality of virtual circuits based on said precedence value, whereby different point-to-point sessions supported on said tunnel receive different QOS.

5. The method of claim 1, further comprising indicating in a table the specific one of said plurality of virtual circuits to which each of said plurality of point-to-point sessions is to be assigned, wherein said assigning comprises examining said table.

6. The method of claim 1, wherein each of said plurality of datagrams is received according to a layer-3 protocol.

7. The method of claim 1, further comprising receiving said packet in said second aggregation device and forwarding the data in said packet to an system related to the corresponding point-to-point session.

8. A first aggregation device for providing different quality of services (QOS) in a communication network to data related to different point-to-point sessions, said aggregation device comprising:

means for provisioning a plurality of virtual circuits, said plurality of virtual circuits being provisioned between said first aggregation device and a second aggregation device located in said communication network, each of said plurality of virtual circuits being provisioned to provide a different QOS;

means for receiving in said first aggregation device a plurality of datagrams, each of said plurality of datagrams being related to a corresponding one of a plurality of point-to-point sessions;

means for determining a point-to-point session to which each of said plurality of datagrams relate to;

means for assigning each of said plurality of datagrams to one of said plurality of virtual circuits depending on the QOS desired for the corresponding point-to-point session; and means for sending the data in each of said datagrams to said second aggregation device in the form of a packet on a corresponding assigned virtual circuit, whereby different point-to-point sessions receive different QOS.

9. The aggregation device of claim 8, wherein said packet comprises an asynchronous transfer mode (ATM) cell.

10. The aggregation device of claim 9, wherein said plurality of virtual circuits supports a tunnel between said first aggregation device and said second aggregation device, wherein said plurality of virtual circuits are comprised in a virtual circuit (VC) bundle, wherein said means for assigning first maps said point-to-point session to said tunnel and then assigns the corresponding datagrams to one of said plurality of virtual circuits depending on a QOS desired for the point-to-point session, wherein said QOS desired for the point-to-point session is specified by a precedence value in a table.

11. The aggregation device of claim 8, further comprising means for indicating the specific one of said plurality of virtual circuits to which each of said plurality of point-to-point sessions is to be assigned, wherein said assigning comprises interfacing with said means for indicating.

12. A first aggregation device for providing different quality of services (QOS) in a communication network to data related to different point-to-point sessions, said aggregation device comprising:

an inbound interface receiving a plurality of datagrams, each of said plurality of datagrams being related to a corresponding one of a plurality of point-to-point sessions;

a memory indicating one of a plurality of virtual circuits to transfer data related to each of said plurality of point-to-point sessions, each of said plurality of virtual circuits being provisioned to provide a different QOS between said first aggregation device and a second aggregation device on said communication network;

a classifier examining each of said plurality of datagrams to determine the specific point-to-point session to which each datagram relates to;

an encapsulator generating a packet corresponding to each of said plurality of datagrams, a header of each packet containing a virtual circuit identifier identifying one of said plurality of virtual circuits, wherein said one of said plurality of virtual circuits is determined based on a QOS desired for a corresponding point-to-point session; and an outbound interface sending said packet corresponding to each of said plurality of datagrams on a virtual circuit specified by the corresponding header, whereby the data related to different point-to-point sessions receives different QOS.

13. The first aggregation device of claim 12, wherein said memory is configured to indicate the specific one of said plurality of virtual circuits to which each of said point-to-point sessions is to be assigned.

14. The first aggregation device of claim 12, wherein said memory is configured to indicate a precedence value representing said QOS desired for each of said point-to-point sessions, and said encapsulator determines said virtual circuit identifier for each of said packets by examining said precedence value.

15. The first aggregation device of claim 12, wherein said packet comprises an asynchronous transfer mode (ATM) cell.

16. The first aggregation device of claim 13, wherein said plurality of virtual circuits supports a tunnel between said first aggregation device and said second aggregation device, wherein said classifier maps said point to point session to said tunnel first and then said point-to-point session is mapped to said one of said plurality of virtual circuits.

17. The first aggregation device of claim 16, wherein said plurality of virtual circuits are comprised in a virtual circuit (VC) bundle.

18. The first aggregation device of claim 12, further comprising a table indicating the specific one of said plurality of virtual circuits to which each of said plurality of point-to-point sessions is to be assigned, wherein said assigning comprises examining said table.

19. The first aggregation device of claim 12, wherein each of said plurality of datagrams is received according to a layer-3 protocol.

20. A computer readable medium carrying one or more sequences of instructions for causing a first aggregation device to provide different quality of services (QOS) in a communication network to data related to different point-to-point sessions, wherein execution of said one or more sequences of instructions by one or more processors contained in said first aggregation device causes said one or more processors to perform the actions of:

provisioning in a first aggregation device a plurality of virtual circuits, said plurality of virtual circuits being provisioned between said first aggregation device and a second aggregation device located in said communication network, each of said plurality of virtual circuits being provisioned to provide a different QOS;

receiving in said first aggregation device a plurality of datagrams, each of said plurality of datagrams being related to a corresponding one of a plurality of point-to-point sessions;

determining a point-to-point session to which each of said plurality of datagrams relates to;

assigning each of said plurality of datagrams to one of said plurality of virtual circuits depending on the QOS desired for the corresponding point-to-point session; and sending the data in each of said datagrams to said second aggregation device in the form of a packet on a corresponding assigned virtual circuit, whereby different point-to-point sessions receive different QOS.

21. The computer readable medium of claim 20, wherein said packet comprises an asynchronous transfer mode (ATM) cell.

22. The computer readable medium of claim 21, wherein said plurality of virtual circuits support a tunnel between said first aggregation device and said second aggregation device, and wherein said plurality of virtual circuits are comprised in a virtual circuit (VC) bundle, said one or more sequences of instructions causing said one or more processors to perform the further action of maintaining a table indicating a mapping of each point-to-point session to said tunnel, wherein said table further indicates a precedence value associated with point-to-point session, wherein said assigning comprises determining said one of said plurality of circuits based on said precedence value.

23. The computer readable medium of claim 20, further comprising indicating in a table the specific one of said plurality of virtual circuits to which each of said plurality of point-to-point sessions is to be assigned, wherein said assigning comprises examining said table.

24. The computer readable medium of claim 20, wherein each of said plurality of datagrams is received according to a layer-3 protocol.

25. The computer readable medium of claim 20, further comprising:

indicating the services to be provided to a user;

determining said user according to an authentication protocol when a corresponding point-to-point session is established; and indicating the services desired for said user using a session identifier assigned to said corresponding point-to-point session.

* * * * *

UNITED STATES PATENT AND TRADEMARK OFFICE
CERTIFICATE OF CORRECTION

| | |
|---|---|
| PATENT NO. | : 6,901,079 B1 |
| APPLICATION NO. | : 09/837457 |
| DATED | : May 31, 2005 |
| INVENTOR(S) | : Amit Phadnis |

Page 1 of 1

It is certified that error appears in the above-identified patent and that said Letters Patent is hereby corrected as shown below:

Col. 2, line 21, replace "AIM" with --ATM--.

Col. 3, line 39, replace "MAS" with --NAS--.

Signed and Sealed this

Twenty-second Day of August, 2006

JON W. DUDAS
*Director of the United States Patent and Trademark Office*